(No Model.)
4 Sheets—Sheet 1.

S. TRIVICK.
APPARATUS FOR TREATING ORES TO OBTAIN PRECIOUS METALS THEREFROM.

No. 442,262.
Patented Dec. 9, 1890.

(No Model.) 4 Sheets—Sheet 2.

S. TRIVICK.
APPARATUS FOR TREATING ORES TO OBTAIN PRECIOUS METALS THEREFROM.

No. 442,262. Patented Dec. 9, 1890.

(No Model.) 4 Sheets—Sheet 3.

S. TRIVICK.
APPARATUS FOR TREATING ORES TO OBTAIN PRECIOUS METALS THEREFROM.

No. 442,262. Patented Dec. 9, 1890.

(No Model.) 4 Sheets—Sheet 4.

S. TRIVICK.
APPARATUS FOR TREATING ORES TO OBTAIN PRECIOUS METALS THEREFROM.

No. 442,262. Patented Dec. 9, 1890.

United States Patent Office.

SIDNEY TRIVICK, OF LONDON, ENGLAND.

APPARATUS FOR TREATING ORES TO OBTAIN PRECIOUS METALS THEREFROM.

SPECIFICATION forming part of Letters Patent No. 442,262, dated December 9, 1890.

Application filed September 17, 1889. Serial No. 324,201. (No model.)

*To all whom it may concern:*

Be it known that I, SIDNEY TRIVICK, analytical chemist and metallurgist, a subject of the Queen of Great Britain, residing at 29 Gauden Road, Clapham, in the county of Surrey, England, have invented a certain new and useful Improvement in Apparatus for Treating Ores to Obtain Precious Metals Therefrom, set forth in the annexed specification and drawings accompanying the same.

This invention relates to improvements in apparatus forming a plant for treating roasted ground ores to obtain precious metals therefrom, adapted for use in treating roasted ground ores of precious metals that have been roasted by any known or suitable method or such method as is described in my application for Letters Patent, dated concurrently herewith, and in such a roasting-furnace as is described in another application of the same date.

The apparatus consists, essentially, of a vessel (preferably employing a pair at least of such vessels, so as to change from one to the other of the pair in working) having a porous bottom on which the ground roasted ores rest, means of supply of leaching-liquid controlled by valve, means of drawing off leached liquid, conveyance thereof to and means of stirring said liquid in a mixing-chamber, a filter-vessel having a porous floor and means of pumping the filtered liquid to a reservoir, means of evaporating the leaching-liquor to recover the contained salts, also recovering the copper salts for reuse, and means of heating the leaching-liquid, and also means of desiccating the product.

The invention also consists in a furnace for roasting ores of precious metals, comprising, among other features, a chamber, coils of piping, a tank, reservoir, a force-pump, a system of heating-pipes, leaching-reservoir, tanks with porous floors, and a mixing-vessel with rotating stirrers therein.

Figure 1:
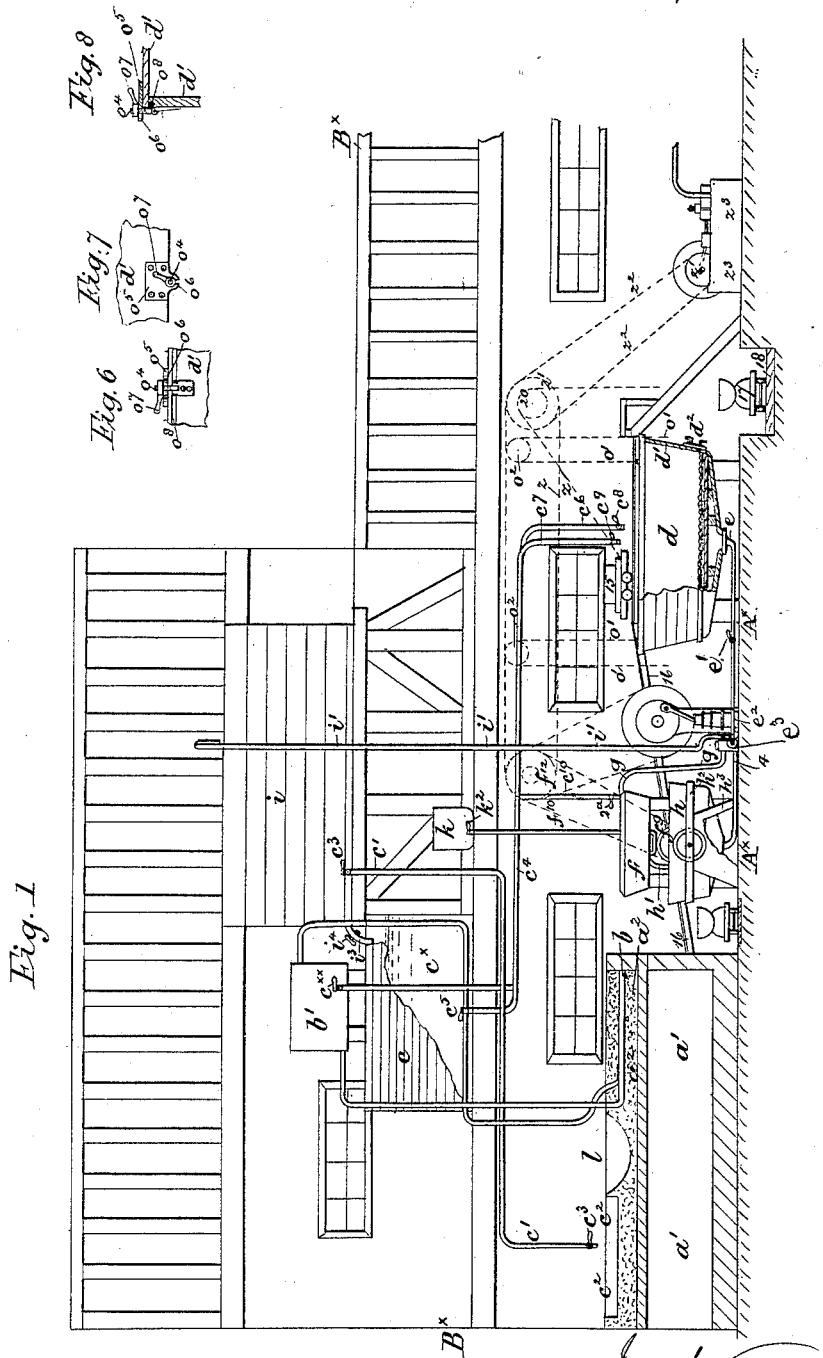
Figure 2:
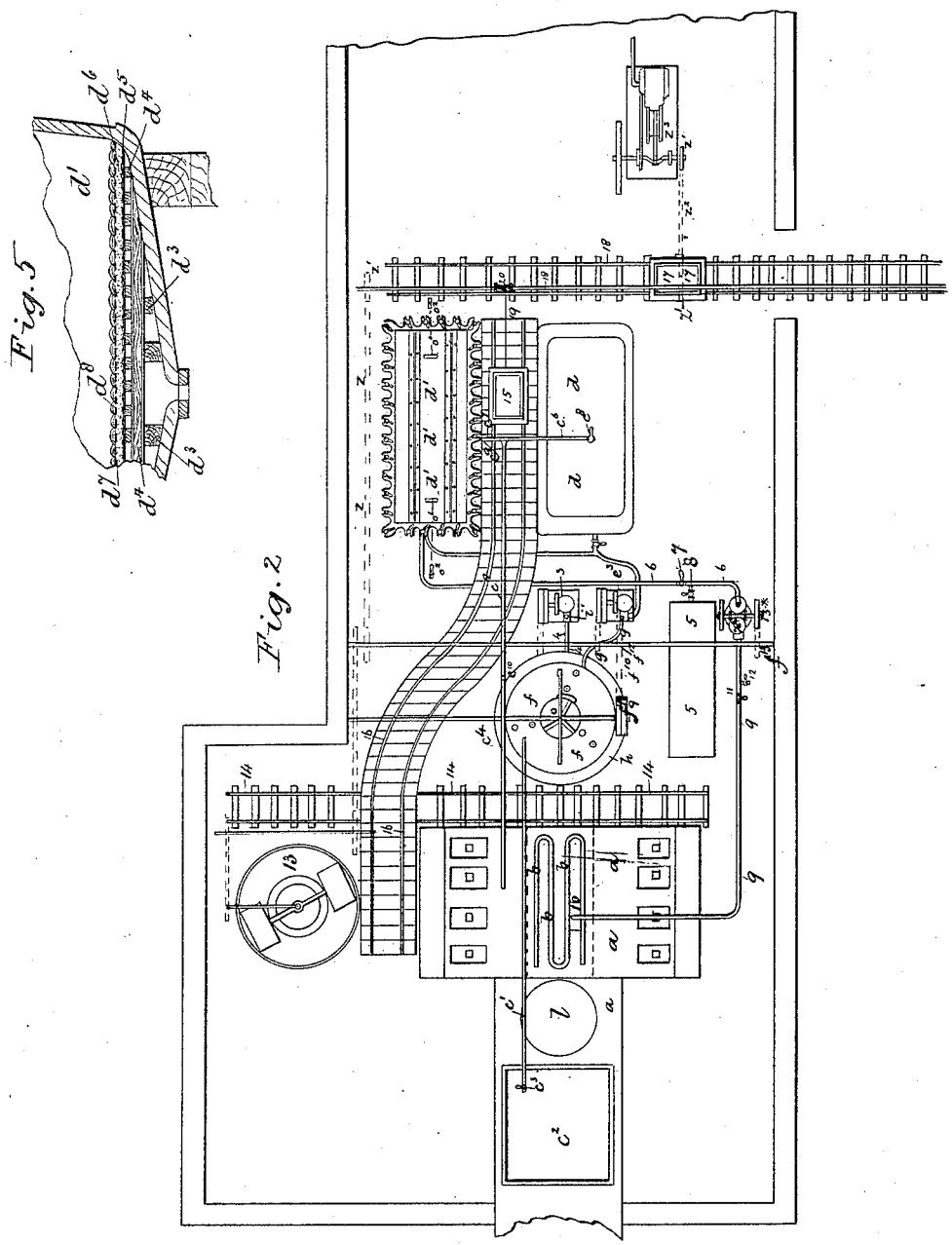
Figure 3:
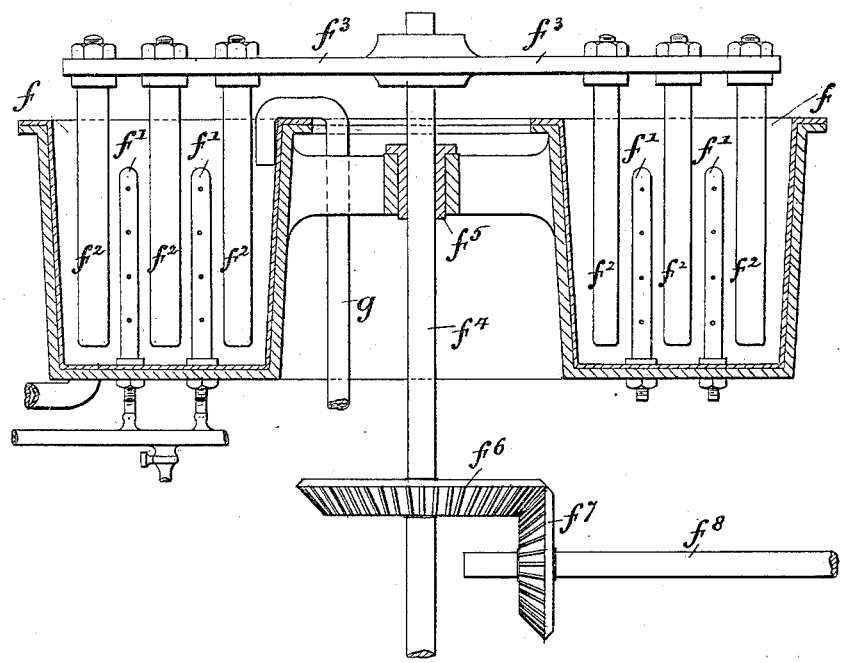
Figure 4:
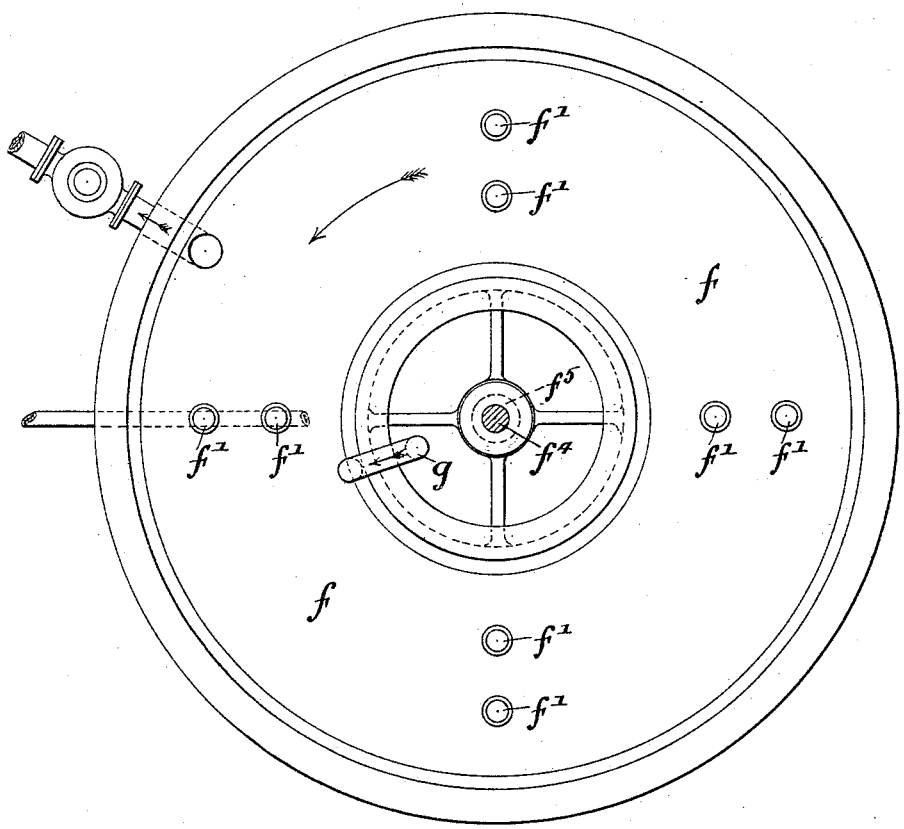

Figure 1 is a vertical sectional elevation of the apparatus forming a plant for the treatment of roasted ground ores to obtain precious metals. Fig. 2 is a ground-floor plan of such plant. Fig. 3 is a separate view of a detail, being the mixer-tank and mixing-arms with the distributing-pipes of the precipitating liquid and means of rotating said mixer-arms. Fig. 4 shows in plan view the mixer-tank with a portion of the mechanism removed, both Figs. 3 and 4 being drawn to a larger scale than the preceding figures.

$a$ indicates a furnace for roasting ores of precious metals, and $a'$ is the flue-chamber thereof.

$a^2$ is a chamber over and heated by the flue-chamber $a'$, packed with sand around a circuit of piping $b$, said piping passing up and into and in a circuit to and fro over the bottom of the leaching-reservoir $c$, thence up to and so as to deliver into the reservoir $b'$, containing hot water, and thence the piping completes the circuit.

13, Fig. 2, is a mill to which the ore is removed after roasting and cooling, by means, say, of a trolley running on the rails 14, from whence it is removed to the tanks $d\ d$ by means of the trolley 15 running on the running-rails 16, such trolley 15 having a rope or line attached to it at 19, which rope is coiled round the winding-drum 20 for the purpose of drawing the trolley up the inclined rails 16.

The reservoir $i$ containing leaching-liquid has a pipe $c'$, which communicates with a pan $c^2$, located behind the semicircular pan $l$ for preparation of precipitating solution, as described, and both pans are located over and so as to be heated by the flue $a'$, so that as leaching-liquor in excess of requirement in a liquid form is let in by the valves $c^3$ to the pan $c^2$ the salts (of chloride of sodium and other soluble chlorides) contained are retained in the pan for reuse in roasting the ores while the water is evaporated.

$c^4$ is a pipe having a valve $c^5$ leading from the reservoir $c$ to the two branch pipes $c^6\ c^7$, which are controlled as to supply by the valves $c^8\ c^9$, and these pipes deliver leaching-liquid into the vats $d\ d'$.

$c^{10}$ is a separate outlet for drawing off leaching-liquor when required, and is fitted with a valve 2.

$c^*$ is a pipe controlled by a valve $c^{}$, through which, when the valve $c^5$ is closed and valves $c^{}$, $c^8$, and $c^9$, or either or any of them is or are open, water may be supplied instead of leaching-liquid to the leaching-vats $d\ d'$. The leaching-vats $d\ d'$ have removable plates $d^2$ covering holes in their sides, useful in removing solid matters to the trolley 17 running on the rails 18, for removal from the building. The floors of these vats are constructed of cross-rafters $d^3$, supporting a floor of perforated wood $d^4$, (best shown by detail view Fig. 5,) on which floor is laid basket-work $d^5$, and again on this basket-work is laid porous straining material $d^6$, for which purpose moss is cheap and good. Above this layer of moss is laid more wicker-work $d^7$. The upper layer of basket-work I underlay or overlay or both under and overlay with canvas $d^8$, as thereby disturbance of the filter is prevented by inflowing liquid.

The bottom of each leaching-vat is sloped to and connected with an exit-pipe $e$, controlled by a tap $e'$, of ordinary construction, and this pipe $e$ and its counterpart both lead by a pipe $e^2$ to a pump $e^3$, which may be of any usual or suitable construction, by which the leached liquid in the pipe $e^2$ is forced up through pipe $g$ into the mixing-vat $f$, wherein it is mixed with precipitating liquid supplied thereto by means of upright perforated tubes $f'$. (Shown separately to an enlarged scale by Figs. 3 and 4.) Rotating arms $f^2$, downwardly projecting from a cross-head $f^3$, pass around in this vat and mix its contents, being driven around as the supporting vertical axis $f^4$ is rotated in its bearings $f^5$ by the toothed wheel $f^6$, being driven by another tooth-wheel $f^7$, mounted on an axis $f^8$ at right angles to the axis $f^6$. On this axis $f^8$ is also mounted another wheel $f^9$, driven by band $f^{10}$ from a wheel $f^{12}$, driven by a band $z$ from any suitable motor, such as by means of the wheel $z'$ from the steam-engine $z^3$. It will now be seen that the coils of sand-packed piping convey and heat the water supplied from the tank, and to which the said water returns; that the piping passes through the sides of the bleaching-liquor reservoir and to and fro over its floor to heat such liquid, and that the tank over the flue-chamber serves to evaporate the bleaching-liquor to recover the salts dissolved therein; that the precipitating liquor is prepared in a pan over the flue-chamber of the furnace and conveyed to a convenient reservoir having a pipe controlled by a valve leading to a precipitating chamber or vessel, which also communicates by pipe with a filter-chamber having the filtering-floor, and that the precipitating-chamber is connected with a force-pump, and that this pump communicates with the bleaching-vat containing the roasted and ground ores, and that the flow of leaching-liquor may be cut off and water let on from the water-heating system for cleansing or otherwise; that the leaching-liquid with its contained precious metals may be delivered to the mixer and stirred or mixed with a precipitating liquid, and then filtered.

Band 13*, Fig. 2, drives an air-pump $z^4$ by means of a pulley $f^{13}$, situate upon the same shaft as $f^{12}$, such air-pump being employed for the purpose of producing pressure upon the surface of the leaching-liquid, for the purpose of effecting filtration, when desirable, in the ore-leaching tank $d'$ or $d$ and in the precipitating filter $h$.

The vats may be arranged for superposed pressure to take the place of the force-pump $e^3$ and also for the purpose of forcing air into a desiccating-chamber 5 (see Fig. 2) through the pipe 6, so that when the tap 7 is closed and the tap 8 is open, the air being pumped through the pipe 9 from a dry-air chamber, as 10, situated above the flue $a'$ of furnace $a$, may be forced into the desiccating-chamber 5, in which I arrange in a suitable manner trays containing the precipitated precious metals obtained from the filter $h$. When the air is required for the purposes of producing pressure in the tank $d'$, the tap 11 in the inlet-pipe 9 may be closed and the tap 12 opened, so that cold air may be obtained, or I may employ hot air.

In Figs. 6, 7, and 8 is indicated the mode of securing the lid of tank $d'$, which is raised and lowered by means of chains $o'$, connected to the lid and passing through the pulley-blocks $o^2$.

$o^4$ is a knuckle-jointed bolt attached as to its jointed end to the body of the tank $d'$, and of which I fit as many as may be necessary to the body of such tank. $o^5$ is one of a series of cast-iron plates secured to the lid of the tank, so that when such lid is in its position on the tank it may rest at right angles to the axis of the bolt $o^4$, and the slotted piece $o^6$ may project sufficiently for the bolt $o^4$ to be introduced by turning it on its hinge toward the slot $o^6$, when it may be tightened down with the other of such bolts by its butterfly-nut $o^7$, and $o^8$ represents suitable packing, which is compressed between the body of the tank and its lid on tightening the nuts, and thus makes an air-tight joint.

The mixed precipitated matters and leaching-liquor are discharged from the vat $f$ into the filtering-vessel $h$ by means of the pipe $h'$, wherein the precipitated matters containing the precious metals are strained from the clear leaching-liquor by means of a filter-bed constructed substantially identically as that to vessel $d$ and shown in part to a larger scale at Fig. 5. This vessel $h$ is supported on trunnions $h^2$, carried in the framing $h^3$, bedded on the floor A*, on which rests the building B* B*, carrying and inclosing the plant.

By means of the pump 3, (shown in Fig. 2,) connected by the pipe A with the filter-bottom in the vessel $h$, the clear leaching-liquid may be withdrawn therefrom and forced up into the reserve reservoir of leaching-liquid $i$ by another pipe $i'$.

$i^3$ is a pipe controlled by a valve $i^4$, leading from the reservoir $i$ to the reservoir $c$ and for refilling of the reservoir $c$ from the reservoir $i$ with liquid as occasion may require.

$l$ is a bath over the furnace-flue for preparing precipitating liquid in for transferrence to the precipitating-liquid reservoir $k$, whence its supply to the mixer $f$ is regulated by the valve $k^2$.

Washing the ore with hot water is very frequently done; but the water is usually heated by forcing steam into the water-tank. In my case the water is heated by water-pipes which pass through the leaching-liquor tank, consequently heating the leaching-liquor at the same time. Usually the adding of the precipitating liquor is done by hand, and the stirring can be accomplished by hand or mechanical means. The precipitate is then allowed to settle and the clear supernatant fluid drawn off. In my invention, however, the automatic mixer delivers the precipitating fluid, and after thorough mixing with the leaching-liquor to precipitate the metals required at once presses onto the filter and the clear liquor is immediately drawn through by the suction-pump and then passes into the leaching-liquor tank.

Having now particularly described and ascertained the nature of my said invention and in what manner the same is to be performed, I declare that what I claim is—

1. A precipitating-vat provided with perforated upright pipes for supplying a precipitating liquid, in combination with mixing-arms projecting downwardly and interspacing with such uprights, and means for rotating the arms.

2. In a plant for extracting gold and silver from ores, a hot-water tank, piping passing over the furnace and through the leaching-liquor tank to such hot-water tank, the leach-liquor tank having distributing-pipes, and a connection directly from such pipes to the hot-water tank, substantially as described.

3. A precipitating-vat for leached liquid containing gold and silver, constructed with a set of upright perforated supply-tubes discharging within the vat and provided with a set of pendent revolving stirrers placed to interspace with the perforated tubes, combined with suitable inlet and outlet pipes and devices for rotating the stirrers, all substantially as set forth.

In testimony whereof I, the said SIDNEY TRIVICK, have hereunto set my hand this 22d day of July, 1889.

SIDNEY TRIVICK.

Witnesses:
ALFRED GEORGE BROOKES,
KENNETH ROMANES.